Sept. 29, 1936. R. E. YOUNG 2,055,641
CONTROL FOR HEATING SYSTEMS
Filed Nov. 24, 1934
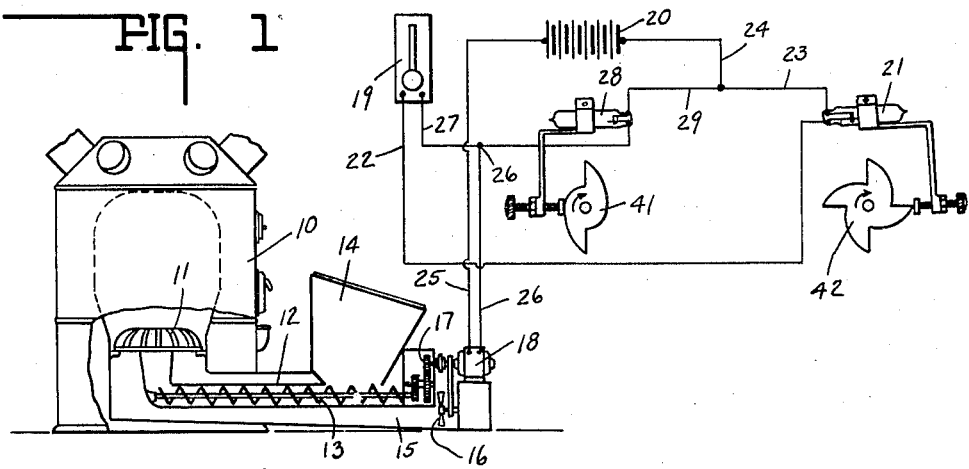
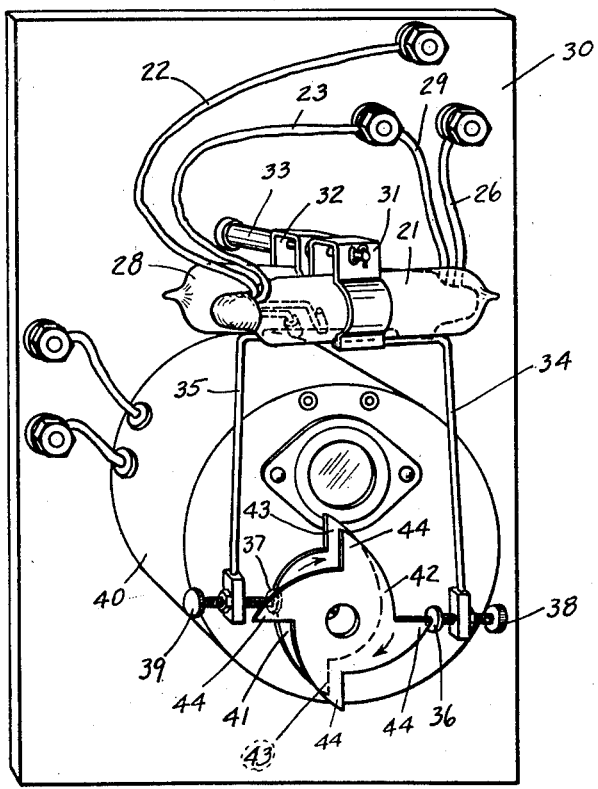
INVENTOR.
RAYMOND E. YOUNG.
BY Lockwood Goldsmith & Galt
ATTORNEYS.

Patented Sept. 29, 1936

2,055,641

UNITED STATES PATENT OFFICE 2,055,641

CONTROL FOR HEATING SYSTEMS

Raymond E. Young, Harvey, Ill., assignor, by mesne assignments, to Whiting Corporation, Harvey, Ill., a corporation Application November 24, 1934, Serial No. 754,550

4 Claims. (Cl. 236—46)

This invention relates to an automatic control for fuel burners, particularly applicable to furnaces, boilers and the like for producing heat delivered at a remote location.

It has been common practice in the control of fuel burners for heating purposes to employ a thermostatic control operated by the heat produced in the remote room or compartment to be heated for controlling the source of heat or furnace. This has generally been accomplished by placing a thermostatic switch at a remote location, which controls a circuit to a motor or the like for operating an oil burner, motor driven stoker, furnace damper or the like. In addition thereto, particularly as to stokers, in order that they may not burn out, an additional control is employed, either time operated or thermostatically operated in or associated with the furnace to actuate the stoker at predetermined intervals of time or in accordance with the temperature at the source of heat.

One difficulty in controlling the source of heat from a remote control, such as a thermostat in a room, is that there is a lapse of time or lag between the production of heat at the furnace and its reception at the point of control. Consequently, when heat is called for at the thermostat, the heat at the furnace is built up to an excessive degree during this lapse of time or lag, resulting in excessive heat ultimately being delivered to the source of control or room in which the thermostat is placed, after the heat requirements are fulfilled and the circuit broken.

It is the object of this invention to employ, in addition to the so-called pilot control, a delayed action or intermittent control associated with the thermostat, which will become effective only upon closing of the thermostat calling for more heat. By this means the heat at the furnace is gradually built up so as not to become too intense or excessive during the above-mentioned lapse of time or lag.

This is accomplished by placing in series with the circuit through the thermostat an intermittent control which may be time operated, adapted to periodically open and close the control circuit through the thermostat to the furnace.

The full nature of the invention will be understood from the accompanying drawing and the following description and claims:

In the drawing, Fig. 1 is a diagrammatical illustration showing the heat source, thermostat and controls. Fig. 2 is a perespective view of the pilot and lag control.

In the drawing there is diagrammatically illustrated a hot air furnace or source of heat 10 having the usual fire pot 11 in which fuel is fed through a conduit 12 by a feed screw 13 from the fuel hopper 14. A forced draft conduit 15 leads into the fire pot through which a forced draft of air is created by a fan 16. Through suitable power transmission mechanism 17 the fuel feed screw is driven by an electric motor 18 which also drives the fan 16.

The control for the furnace comprises a thermostatic switch 19 which may be placed in a room or compartment and which is connected in circuit with a source of current 20, motor 18 and a lag control mercury switch 21, through the wires 22, 23, 24, 25 and 26.

A pilot mercury switch 28 is in an independent circuit with the motor and the source of current 20 through the wires 29, 24, 25 and 26.

For operating the pilot and lag control switches 21 and 28, there is illustrated a panel 30 upon which the mercury switches 21 and 28 are pivotally mounted by the spring clips 31 and 32, respectively, which clips are supported upon a pin 33 extending outwardly from the panel so as to freely swing thereon. Secured to the spring clips 31 and 32, there are downwardly-extending rods 34 and 35, respectively, having adjustable engaging heads 36 and 37, adjustably mounted in the lower ends thereof operable by the thumb screws 38 and 39.

Mounted on the panel 30 there is a clockwork 40 which may be either electrically or spring actuated. Rotated by the clockwork there is an inner pilot cam 41 and an outer lag control cam 42, the cam 41 having a pair of oppositely-disposed cam-like projections 43 and the outer lag control cam having four evenly spaced cam projections 44. A pair of the oppositely-disposed projections 44 is positioned in alignment with the projections 43. The engaging heads 36 and 37 are positioned to ride upon the peripheral edge of the cams 42 and 41, respectively, so as to pass about and be pushed outwardly by the projections 44 and 43. The mercury switches and their associated rods are so balanced that they are normally in such position that the circuit therethrough is broken and the heads 36 and 37 approach the center of the cams. In other words, they are normally balanced with the rods 34 and 35 swung inwardly.

In operation, assuming that the fuel in the fire pot is burning and the room temperature is such that the thermostat switch is open, the periodic rotation of the pilot cam 41 by the clock will cause the head 36 to be moved outwardly as it rides over the projection 43. Its outward movement will reach a position where the mercury switch 28 will be tilted at such an angle as to cause the mercury therein to pass to the contact end for bridging the contact contained in the switch and closing the circuit through the source of current 20 and the motor. Thus, additional fuel will be fed into the fire pot and necessary draft created. Depending upon the timing of the clock, this will occur twice during a given period or each cycle. By means of the adjustment of the set screw 39 the duration of the time the circuit will be closed each period or cycle, and the interval between such closings may be varied, depending upon the character of the furnace and fuel. Thus, if the head 37 is screwed inwardly from the rod 35, the mercury tube will be tilted at a greater angle so that the contacts will be closed upon the head reaching a point on the periphery of the cam farther from the end of the projection 43. Such adjustment would increase the duration of the feeding action of the furnace and decrease the interval between actions. The reverse adjustment of the thumb screw 39 would have the opposite effect of decreasing the duration of operation and increasing the interval therebetween. Thus, the pilot control may be adjusted whereby the furnace will be operated periodically and prevent the fire from burning out, particularly in mild weather, or wherein the thermostat does not close the circuit.

The lag control operates in the same manner excepting the contacts in the mercury switch 21 are closed four times during each cycle, the duration thereof and interval between closings being adjustable by manipulation of the thumb screw 38. However, the closing of the switch 21 will have no effect upon the operation of the furnace unless the thermostatic switch 19 is closed. Thus, the pilot control is one means of operating the furnace when the thermostatic switch 19 is opened, irrespective of the lag control switch 21 and cam 42.

Upon the requirement for more heat at the location of the thermostat, and in accordance with its adjustment, the thermostatic switch 19 will be closed and remain closed until sufficient heat has not only been generated in the furnace, but has found its way to the location of the thermostat. In that event, the circuit through the switch 21 will be closed so that the furnace will be operated upon closing of the switch 21 and for the duration thereof. This will occur four times during the cycle, the duration of each action and intervening intervals varying according to the adjustment of the set screw 38.

In view of the above, it will be observed that when the thermostat calls for more heat, instead of the furnace being continuously operated until the thermostat cuts off, it will be only intermittently operated so as to more gradually build up the heat, the intermittent operation being adjustable. As a result, the first action will be to immediately boost the burning of the fuel to effect an immediate increase in heat production. But instead of overfeeding the fuel and, therefore, building up an unnecessary potential amount of heat, which will take a long period to consume after the thermostat switch opens, the fuel will be fed only as consumed and needed to maintain an immediate increased amount of heat, but without overfeeding and building up excessive potential heat. Therefore, immediately upon the heat at the thermostat being sufficient to cause it to open, the source of heat or furnace will proceed to cool down since the fuel periodically fed therein has been consumed during each interval of feeding and has not been built up by constant feeding to produce an oversupply of unconsumed fuel for potential heat which will continue to find its way to the thermostat after it is no longer needed. This will effect a much more sensitive control of the source of heat from the remote source of control and thereby avoid excessive variations in temperature.

The invention claimed is:

1. In a furnace, the combination with a mechanical fuel feed, of a motor for driving the same, a source of current, a pair of circuits including said motor and source of current, a control switch in each of said circuits, a clock mechanism, a pair of cams mounted to be driven by said clock mechanism, means actuated by said cams for periodically opening and closing said switches independently of each other, adjustments on said means for varying the duration of the open and closed positioning of said switches, and a thermostatically controlled switch in one of said circuits.

2. In a furnace, the combination with a mechanical fuel feed, of a motor for driving the same, a source of current, a pair of circuits including said motor and source of current, a control switch in each of said circuits, clock mechanism, a pair of cams mounted to be driven by said clock mechanism, one of said cams being provided with a greater number of projecting cam surfaces than the other cam, a thermostatically controlled switch in circuit with said first-mentioned cam, and an arm actuated by each of said cams for operating the control switch of said circuits respectively, whereby said feed will be more frequently operated by the first-mentioned cam in conjunction with the thermostatically controlled switch and less frequently by the second-mentioned cam independently thereof.

3. In a furnace, the combination with a mechanical fuel feed and a fan for providing a forced draft, of a motor for jointly and simultaneously driving the feed and draft, a source of current, a pair of circuits including said motor and source of current, a control switch in each of said circuits, a cam member for actuating each of said switches to open and close their respective circuits, clock mechanism operable independently of said circuits for driving each of said cam members, one of said cam members being adapted to actuate its switch to open and close its respective circuit at more frequent intervals than the other cam member actuates its switch, and a thermostatically controlled switch in the circuit with the more frequently operated switch whereby said feed and draft will be simultaneously and intermittently operated upon a call for heat by said thermostatic switch, and will be simultaneously and periodically operated by the other circuit independently of said thermostatic switch for maintaining a kindling fire.

4. In a furnace, the combination with a mechanical fuel feed and draft, of a motor for simultaneously driving said feed and draft, a source of current, a pair of circuits including said motor and source of current, a control switch in each of said circuits, a cam for actuating each of said switches for opening and closing its respective circuit, clock mechanism continuously operable independently of said circuits for driving said cams, one of said cams being adapted to operate its associated switch at more frequent intervals than the other cam, a thermostatically controlled switch in circuit with said first-mentioned cam, and an arm actuated by each of said cams for operating their respective switches, whereby said feed and draft will be more frequently operated by the first-mentioned cam in circuit with the thermostatic switch and less frequently by the second mentioned cam independently of said thermostatic switch.

RAYMOND E. YOUNG.